(12) United States Patent
Yang et al.

(10) Patent No.: US 9,203,738 B2
(45) Date of Patent: Dec. 1, 2015

(54) OPTIMAL FORWARDING FOR TRILL FINE-GRAINED LABELING AND VXLAN INTERWORKING

(71) Applicant: Cisco Technology, Inc., San Jose, CA (US)

(72) Inventors: Yibin Yang, San Jose, CA (US); Chiajen Tsai, Cupertino, CA (US); Liqin Dong, San Jose, CA (US); Shyam Kapadia, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 207 days.

(21) Appl. No.: 13/898,572

(22) Filed: May 21, 2013

(65) Prior Publication Data

US 2014/0348166 A1 Nov. 27, 2014

(51) Int. Cl.
*H04L 12/721* (2013.01)

(52) U.S. Cl.
CPC .............. *H04L 45/124* (2013.01); *H04L 45/66* (2013.01)

(58) Field of Classification Search
CPC .................................................. H04L 45/124
See application file for complete search history.

(56) References Cited

U.S. PATENT DOCUMENTS

| | | | |
|---|---|---|---|
| 2008/0219168 A1* | 9/2008 | Enomoto et al. | 370/237 |
| 2012/0327937 A1* | 12/2012 | Melman et al. | 370/392 |
| 2013/0259050 A1* | 10/2013 | Eastlake, III | 370/392 |
| 2013/0301642 A1* | 11/2013 | Radhakrishnan et al. | 370/392 |
| 2014/0029412 A1* | 1/2014 | Janardhanan | 370/221 |
| 2014/0223027 A1* | 8/2014 | Mullapudi et al. | 709/238 |
| 2014/0347975 A1* | 11/2014 | Yoshimoto et al. | 370/218 |
| 2014/0355475 A1* | 12/2014 | Yang et al. | 370/254 |
| 2015/0023352 A1* | 1/2015 | Yang et al. | 370/392 |
| 2015/0063353 A1* | 3/2015 | Kapadia et al. | 370/392 |

OTHER PUBLICATIONS

Eastlake, D., et al., "TRILL: Fine-Grained Labeling," Internet draft, <draft-ietf-trill-fine-labeling-01.txt>, TRILL Working Group, Jun. 9, 2012, 22 pages.

Mahalingam, M., et al., "VXLAN: A Framework for Overlaying Virtualized Layer 2 Networks over Layer 3 Networks," Internet draft, <draft-mahalingam-dutt-dcops-vxlan-01.txt>, Network Working Group, Feb. 24, 2012, 21 pages.

Perlman, R., et al., "RBridges: Base Protocol Specification," Internet draft, <draft-ietf-trill-rbridge-protocol-16.txt>, TRILL Working Group, Mar. 3, 2010, 118 pages.

* cited by examiner

*Primary Examiner* — Hassan Kizou
*Assistant Examiner* — Deepa Belur
(74) *Attorney, Agent, or Firm* — Meunier Carlin & Curfman LLC (57) ABSTRACT

An example method for determining an optimal forwarding path across a network having VxLAN gateways configured to implement both FGL networking and VxLAN capabilities can include learning RBridge nicknames associated with the VxLAN gateways in the network. Additionally, the method can include determining a path cost over the FGL network between each of the VxLAN gateways and a source node and a path cost over the VxLAN between each of the VxLAN gateways and a destination node. Further, the method can include determining an encapsulation overhead metric associated with the VxLAN and selecting one of the VxLAN gateways as an optimal VxLAN gateway. The selection can be based on the computed path costs over the FGL network and the VxLAN and the encapsulation overhead metric.

17 Claims, 5 Drawing Sheets

OPTIMAL FORWARDING FOR TRILL FINE-GRAINED LABELING AND VXLAN INTERWORKING

BACKGROUND

IETF Transparent Interconnect of Lots of Links ("TRILL") provides an architecture of Layer 2 control and forwarding that provides benefits such as pair-wise optimal forwarding, loop mitigation, multipathing and provisioning free. The TRILL protocol is described in detail in Perlman et al., "RBridges: Base Protocol Specification," available at http://tools.ietf.org/html/draft-ietf-trill-rbridge-protocol-16. The TRILL base protocol supports approximately four-thousand customer (or tenant) identifications through the use of inner virtual local area network ("VLAN") tags. The number of tenant identifications provided by the TRILL base protocol is insufficient for large multi-tenant data center deployments. Thus, a fine-grained labeling ("FGL") networking scheme has been proposed to increase the number of tenant identifications to approximately sixteen million through the use of two inner VLAN tags. The FGL networking scheme is described in detail in Eastlake et al., "TRILL: Fine-Grained Labeling," available at http://tools.ietf.org/html/draft-ietf-trill-fine-labeling-01.

Virtual extensible local area network ("VxLAN") is a networking scheme that provides a Layer 2 overlay on top of Layer 3 network infrastructure. Similar to FGL, VxLAN supports approximately sixteen million tenant identifications. Specifically, according to VxLAN, customer frames are encapsulated with a VxLAN header containing a VxLAN segment ID/VxLAN network identifier ("VNI"), which is a 24-bit field to identify virtual Layer 2 networks for different tenants. The VxLAN networking scheme is discussed in detail in Mahalingham et al., "VXLAN: A Framework for Overlaying Virtualized Layer 2 Networks over Layer 3 Networks," available at http://tools.ietf.org/html/draft-mahalingam-dutt-dcops-vxlan-01.

As two complementary network virtualization schemes, TRILL FGL and VxLAN can co-exist in a multi-tenant data center. To facilitate their interworking, VxLAN origination and termination capabilities can be built into application-specific integrated circuits ("ASICs") already supporting TRILL. In other words, packet-switching devices can be built with VxLAN gateway functionality. A VxLAN gateway can be configured to push FGL frames into VxLAN tunnels, as well as decapsulate frames from VxLAN tunnels for further forwarding as FGL frames. Accordingly, traffic can flow over the same physical network either natively in FGL or overlay in VxLAN.

SUMMARY

Methods, systems and devices for determining an optimal forwarding path across a network that implements two different logical networking schemes are provided herein. The methods, systems and devices can compute the total path costs for traffic flowing via a plurality of forwarding paths, while accounting for the differences in the encapsulation overhead associated with the logical networking schemes. Optionally, the path costs over the logical network with the greater encapsulation overhead can be weighted accordingly. After computing the total path costs, the optimal path among the plurality of forwarding paths can be determined and optionally used when the traffic is forwarded over the network.

An example network can include a plurality of RBridges configured to implement networking protocols for switching packets over an FGL network and a VxLAN. These RBridges can therefore be configured to implement both FGL networking and VxLAN functionalities. RBridges configured to implement both FGL networking and VxLAN functionalities are also referred to as VxLAN gateways herein. Traffic (e.g., packets, frames, etc.) can traverse the same physical network over two different logical networks (e.g., the FGL network and the VxLAN).

An example method for determining an optimal forwarding path across a network having VxLAN gateways configured to implement both FGL networking and VxLAN capabilities can include learning one or more RBridge nicknames, where each RBridge nickname is uniquely associated with one of the VxLAN gateways in the network. Additionally, the method can include determining a path cost over the FGL network between each of the VxLAN gateways and a source node and determining a path cost over the VxLAN between each of the VxLAN gateways and a destination node. The method can also include determining an encapsulation overhead metric associated with switching packets over the VxLAN. Further, the method can include selecting one of the VxLAN gateways as an optimal VxLAN gateway. The selection can be based on the path cost over the FGL network between each of the VxLAN gateways and the source node, the path cost over the VxLAN between each of the VxLAN gateways and the destination node and the encapsulation overhead metric.

Optionally, the method can include transmitting or receiving a message using a link state protocol. The message can include at least one of an RBridge nickname and an IP address associated with one of the VxLAN gateways in the network. In this way, the RBridge nicknames are exchanged by the VxLAN gateways in the network, and the VxLAN gateways can learn the RBridge nicknames for the other VxLAN gateways in the network. The link state protocol can optionally be a TRILL intermediate system to intermediate system ("IS-IS") link state protocol, for example.

Alternatively or additionally, the method can optionally include weighting the path cost over the VxLAN between each of the VxLAN gateways and the destination node by the encapsulation overhead metric.

When the source node is a physical server, the method can optionally include determining an RBridge to which the physical server is connected using a media access control ("MAC") address table. For example, the RBridge to which the physical server is connected can be learned through MAC learning, e.g., an RBridge can learn the binding between the MAC address associated with the physical server and the RBridge nickname of the ingress RBridge. In addition, the path cost over the FGL network between each of the VxLAN gateways and the source node can be determined as a path cost over the FGL network between each of the VxLAN gateways and the RBridge to which the physical server is connected.

When the destination node is a VxLAN server, the method can optionally include determining an RBridge to which the VxLAN server is connected using a VxLAN table, an address resolution protocol ("ARP") table and a MAC address table. For example, the RBridge to which the VxLAN server is connected can be learned from several bindings: (1) the binding between the MAC address associated with the VxLAN server and the IP address associated with the VxLAN tunnel endpoint ("VTEP") (e.g., VxLAN learning), (2) the binding between the IP address associated with the VTEP and the MAC address associated with the VTEP (e.g., ARP), and (3) the binding between the MAC address associated with the VTEP and the RBridge nickname of the ingress RBridge (e.g., MAC learning). In addition, the path cost over the VxLAN between each of the VxLAN gateways and the destination node can be determined as a path cost over the VxLAN between each of the VxLAN gateways and the RBridge to which the VxLAN server is connected.

Optionally, the method can further include notifying at least one of an RBridge to which the source node is connected and an RBridge to which the destination node is connected of the optimal VxLAN gateway. Additionally, in order to notify an RBridge of the optimal VxLAN gateway, the method can optionally include encapsulating a frame with at least one of an RBridge nickname or an IP address associated with the optimal VxLAN gateway. For example, to notify an RBridge to which a physical server is connected, the frame can be encapsulated with the RBridge nickname of the optimal VxLAN gateway as the ingress RBridge nickname, in some cases, instead of the RBridge nickname of the non-optimal VxLAN gateway processing the frame. The RBridge to which the physical server is connected can therefore learn the desired MAC address and RBridge nickname binding and redirect traffic to the optimal VxLAN gateway. Alternatively or additionally, to notify a VTEP of the optimal VxLAN gateway, the frame can be encapsulated with the IP address of the optimal VxLAN gateway as the source IP address, in some cases, instead of the IP address associated with the non-optimal VxLAN gateway processing the frame. The VTEP can therefore learn the desired MAC address and IP address binding and redirect traffic to the optimal VxLAN gateway.

Alternatively or additionally, to notify an RBridge to which a physical server is connected of the optimal VxLAN gateway, the method can optionally include advertising a plurality of bindings between a MAC address associated with the destination node and RBridge nicknames and path costs associated with the VxLAN gateways in the network. Optionally, a modified MAC Reachability TLV carried by the TRILL End System Address Distribution Information ("ESADI") protocol can be used for announcing the plurality of bindings and associated path costs. Alternatively or additionally, to notify a VTEP of the optimal VxLAN gateway, the method can optionally include advertising a plurality of bindings between a MAC address associated with the source node and IP addresses and path costs associated with the VxLAN gateways in the network. Optionally, a VxLAN Gateway Address Distribution Information ("VGADI") protocol can be used for announcing the plurality of bindings and associated path costs.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. While implementations will be described for determining an optimal forwarding path across a physical network where FGL and VxLAN networking schemes are implemented, it will become evident to those skilled in the art that the implementations are not limited thereto, but are applicable for determining an optimal forwarding path across a network that implements two different logical networking schemes.

Figure 1:
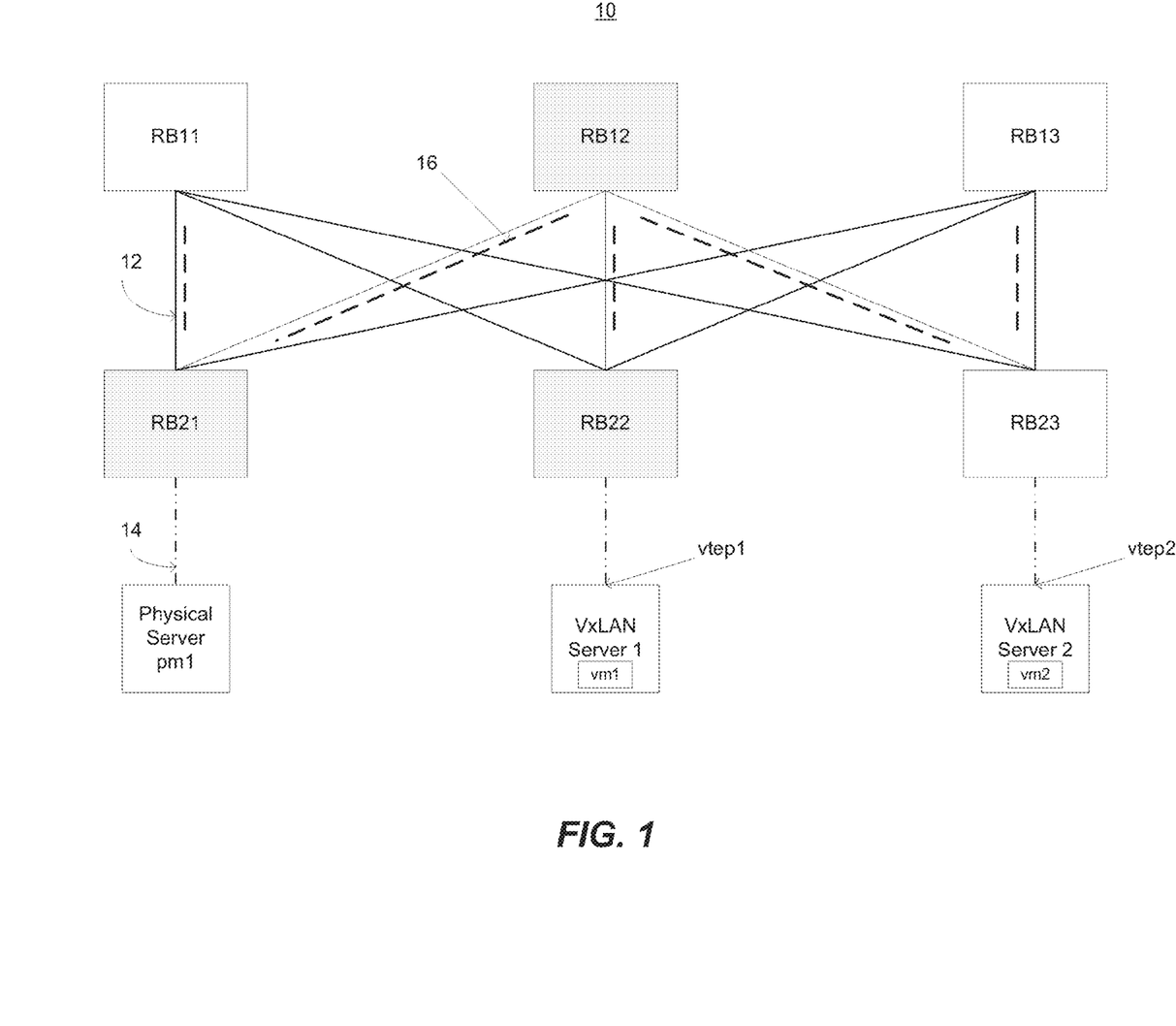
FIG. 1 is a block diagram illustrating an example physical network.

Referring now to FIG. 1, a block diagram illustrating an example physical network 10 is shown. For example, the network 10 can be a multi-tenant data center deployment where FGL and VxLAN networking schemes are implemented for network virtualization. The network 10 can include RBridges RB11, RB12, RB13, RB21, RB22 and RB23, physical server pm1 and VxLAN servers 1 and 2. Virtual machines vm1 and vm2 run on VxLAN servers 1 and 2, respectively. The RBridges and servers discussed above can be communicatively connected through one or more communication links. This disclosure contemplates the communication links are any suitable communication link. For example, a communication link may be implemented by any medium that facilitates data exchange between the network elements including, but not limited to, wired, wireless and optical links. It should be understood that the network 10 shown in FIG. 1 is provided only as an example. A person of ordinary skill in the art may provide the functionalities described herein in a network having more or less elements than shown in FIG. 1.

RBridges are packet-forwarding devices (e.g., switches, bridges, etc.) that are configured to implement the TRILL protocol. The TRILL protocol is well-known in the art and is therefore not discuss in further detail herein. TRILL links 12 between the RBridges are shown as solid lines in FIG. 1. In addition, each of RBridges RB11, RB12, RB13, RB21, RB22 and RB23 can be configured to support the FGL networking scheme. As discussed above, according to the FGL networking scheme, two inner VLAN tags are used to increase the number of available tenant identifications as compared to the number of tenant identifications available using the TRILL base protocol. RBridges RB12, RB21 and RB22 (e.g., the shaded RBridges in FIG. 1) can be configured to support the VxLAN networking scheme in addition to the FGL networking scheme. Similar to the FGL networking scheme, the VxLAN networking scheme increases the number of available tenant identifications. The FGL and VxLAN networking schemes are optionally implemented in large multi-tenant data centers due to the large number of available tenant identifications. RBridges RB12, RB21 and RB22 are also referred to as "VxLAN gateways" below because RBridges RB12, RB21 and RB22 can interface with both the FGL and VxLAN logical networks.

As shown in FIG. 1, three servers are communicatively connected to the network 10 through edge RBridges RB21, RB22 and RB23. Optionally, the servers are connected to the network 10 through classic Ethernet links 14 shown as dotted-dashed lines in FIG. 1. In particular, physical server pm1 is connected to RBridge 21. It should be understood that physical server pm1 is not configured or capable of performing VxLAN encapsulation/decapsulation. Additionally, VxLAN servers 1 and 2 are connected to RB22 and RB23, respectively. It should be understood that VxLAN servers 1 and 2 are configured or capable of performing VxLAN encapsulation/decapsulation. VxLAN servers 1 and 2 have respective VTEPs vtep1 and vtep2 to originate and terminate VxLAN tunnels for their respective virtual machines vm1 and vm2.

Figure 2:
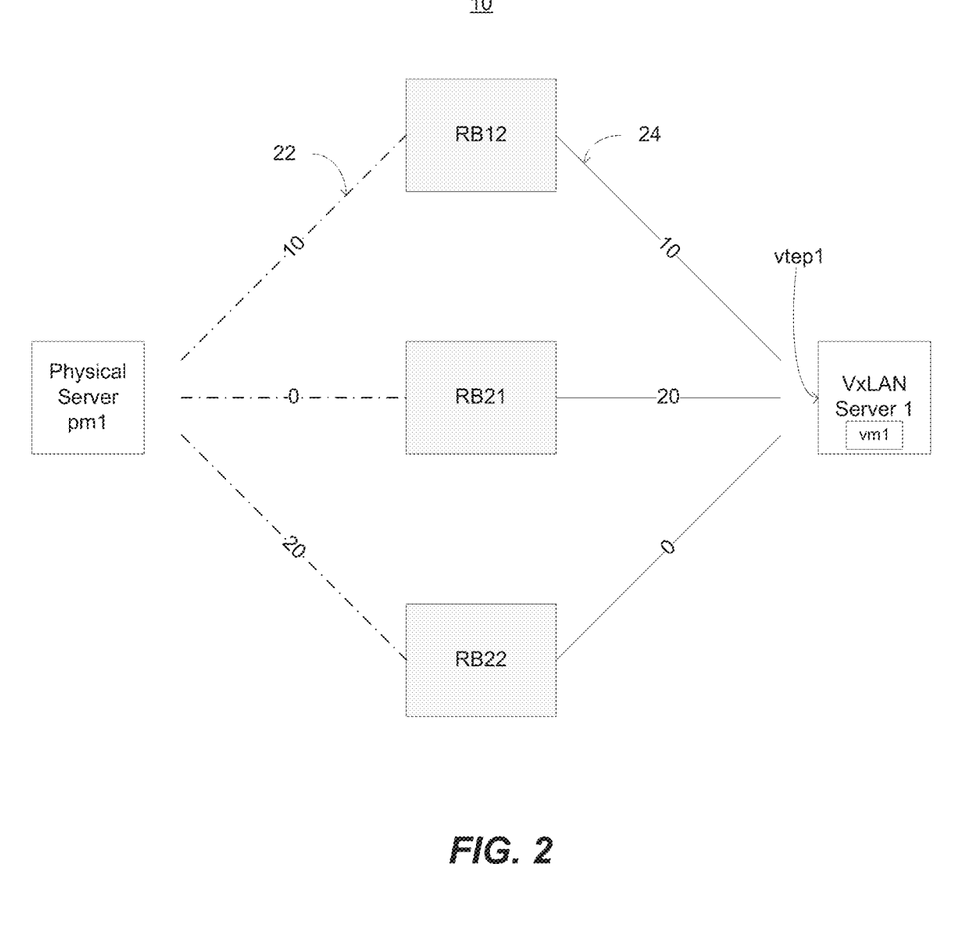
FIG. 2 is a block diagram illustrating forwarding paths in two logical networks over the network shown in FIG. 1.

When traffic (e.g., a packet, frame, etc.) is forwarded from one server to another (e.g., from physical server pm1 to VxLAN server 1), the traffic can be transported in two formats—natively in FGL and overlay in VxLAN. Conceptually, the traffic traverses two logical networks (e.g., the FGL and VxLAN networks) on top of the same physical network 10. This is shown in FIG. 2, which is a block diagram illustrating the forwarding paths in the two logical networks over the network 10 of FIG. 1. It should be understood that a plurality of (or multiple) forwarding paths exist between physical server pm1 and VxLAN server 1 due to fact that there are multiple VxLAN gateways (i.e., RB12, RB21 and RB22) in the network 10. Thus, the traffic flowing from physical server pm1 can reach VxLAN server 1 via RBridges RB12, RB21 or RB22 (i.e., the VxLAN gateways). When there are multiple forwarding paths available, it is desirable to configure the RBridges to perform optimal forwarding across the network 10. In other words, it is desirable to configure the RBridges to identify and use the optimal VxLAN gateway when forwarding traffic.

In the example implementations described below for determining an optimal forwarding path in the network 10, it is assumed that all links in the network 10 are the same (e.g., 10 G links) and that all links have the same default metric value of 10. Although all links in the network 10 are assumed to be equal for the purpose of the examples, this disclosure contemplates that all of the links in the network 10 may not be equal. It should be understood that in an arbitrary network topology the path costs of the multiple forwarding paths can be different due to the link metric values and/or the hop count. Further, even in a two-tier fat tree network topology with equal link metric values (e.g., the network topology shown in FIG. 1), differences in path costs can exist, for example, due to the differences in the encapsulation overhead incurred by the networking schemes.

As discussed in further detail below, example techniques for determining an optimal forwarding path are provided with reference to the two-tier fat tree network topology shown in FIG. 1. This disclosure contemplates that the example techniques are also applicable to arbitrary network topologies as well. With reference to FIG. 2, the multiple forwarding paths for traffic flowing from physical server pm1 to VxLAN server 1, e.g., via each of RBridges RB12, RB21 and RB22 (e.g., the VxLAN gateways) are illustrated. The FGL paths 22 are shown by dotted-dashed lines and the VxLAN paths 24 are shown by solid lines in FIG. 2. Further, the FGL path costs between physical server pm 1 and each of RBridges RB12, RB21 and RB22 are 10, 0 and 20, respectively. For example, there is one hop (e.g., from RBridge RB21 to RBridge RB12) between physical server pm1 and RBridge RB12. It should be understood that in the examples described herein the first hops (e.g., between physical server pm1 and RBridge RB21 and between VxLAN server 1 and RBridge RB22) are ignored because these hops will be the same regardless of the chosen forwarding path. The VxLAN path costs between VxLAN server 1 and each of RBridges RB12, RB21 and RB22 are 10, 20 and 0, respectively. For example, there are two hops (e.g., from RBridge RB21 to RBridge RB12 to RBridge RB22) between RBridge RB21 and VxLAN server 1.

Figure 3:
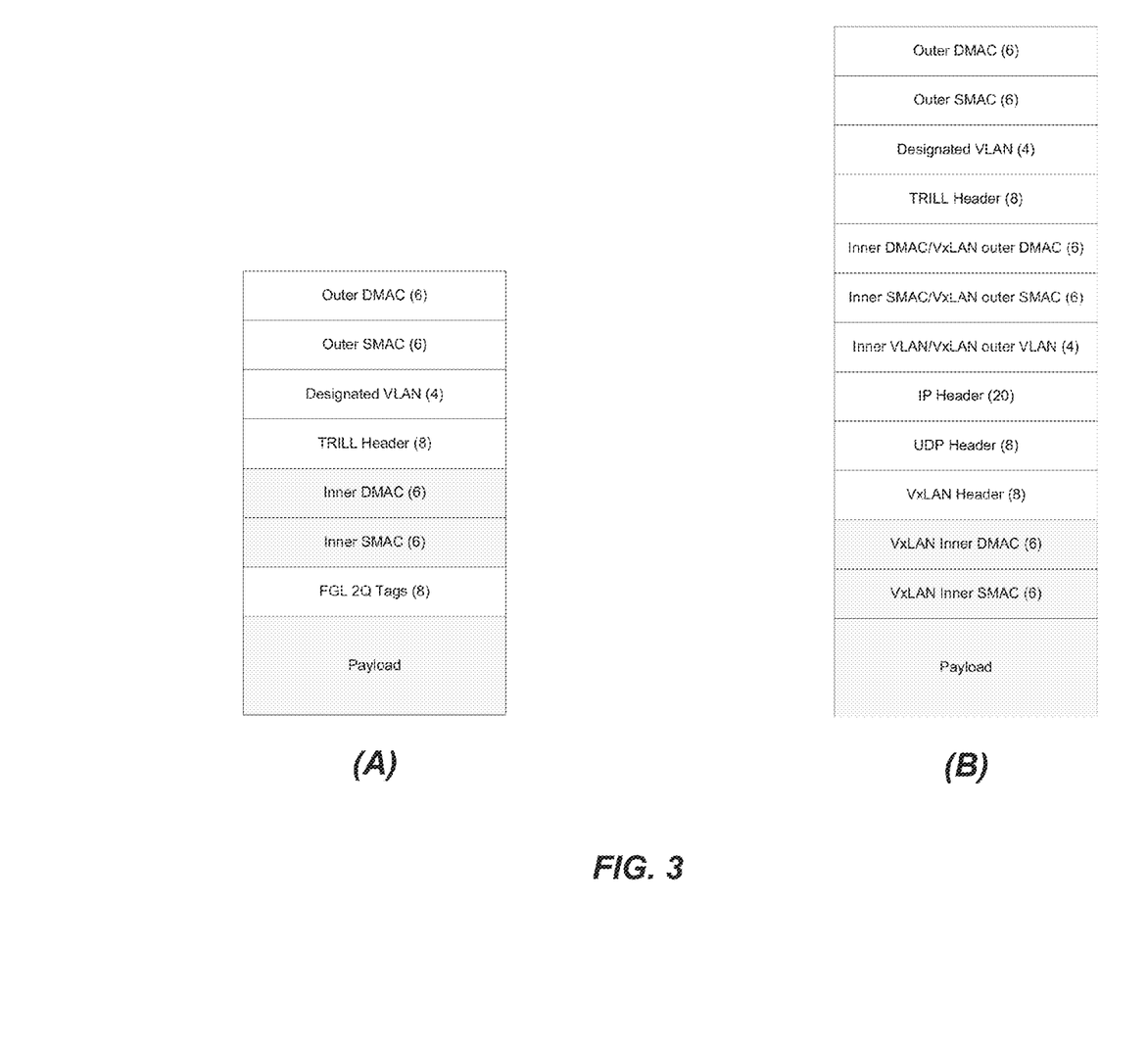
FIGS. 3A-3B are block diagrams illustrating example frame formats according to networking schemes discussed herein.

Considering the two-tier fat tree network topology of FIG. 1, each of the multiple forwarding paths between physical server pm1 and VxLAN server 1 appear to have the same total path cost (e.g., 20) on the surface. However, due to differences between FGL and VxLAN encapsulations, the forwarding path with the fewest hops over the VxLAN (e.g., when RBridge RB22 is the VxLAN gateway) is actually the optimal path due to the encapsulation overhead introduced by VxLAN encapsulation as compared to FGL encapsulation. For example, referring now to FIGS. 3A-3B, block diagrams illustrating example frame formats according to networking schemes discussed herein are shown. In FIGS. 3A-3B, the original customer frame (e.g., inner source and destination MAC addresses and packet payload) are shaded. FIG. 3A illustrates an example FGL frame, which adds 32 bytes to the original customer frame. FIG. 3B illustrates an example VxLAN frame, which adds 76 bytes to the original customer frame. The VxLAN tunnel over the network 10, therefore, introduces an additional 44-byte encapsulation overhead per frame as compared to using FGL. Thus, the optimal forwarding path is via RBridge RB22 (e.g., RBridge RB22 acts as the VxLAN gateway). It should be understood that the fields/sizes shown in the example frames of FIGS. 3A-3B are provided only as examples and that the FGL frame and/or the VxLAN frame may have more or less fields/sizes than those shown.

Path Cost Computation

To facilitate optimal forwarding across the network 10, the total path cost over the two logical networks (e.g., the FGL and the VxLAN networks) can be computed. Additionally, differences between the frame formats of the two logical networks (e.g., the FGL and VxLAN networks) can be taken into consideration when computing the total path cost. Further, gateway devices (e.g., RBridges RB12, RB21 and RB22 or the VxLAN gateways) can be configured to carry out the total path cost computation because the gateways connect the logical networks.

As discussed above, the VxLAN gateways such as RBridges RB12, RB21 and RB22, for example, can be configured to carry out the total path cost computation. Further, as discussed above, the VxLAN gateways are RBridges and therefore are configured to implement the TRILL protocol. As such, the VxLAN gateways can learn the network topology by exchanging link state information using the TRILL IS-IS link state protocol. This disclosure contemplates that the VxLAN gateways can optionally use other standard or proprietary protocols for exchanging link state information. Using the link state information, the VxLAN gateways can compute their own path costs to/from any of the RBridges in the network 10. For example, RBridge RB12 (e.g., one of the VxLAN gateways) can compute its path cost to each of RBridges RB21, RB22 and RB23 as 10 using the link state information. In addition, the VxLAN gateways can compute the path costs of the other VxLAN gateways to/from any of the RBridges in the network 10 if the VxLAN gateways know the other RBridge nicknames of the other VxLAN gateways. For example, provided RBridge RB12 (e.g., one of the VxLAN gateways) knows the RBridge nickname associated with RBridge RB21 (e.g., one of the other VxLAN gateways), it can compute the path cost between RBridge RB21 and each of RBridges RB22 and RB23 as 20 using the link state information. Thus, to calculate the total path costs across the two logical networks (e.g., the FGL and VxLAN networks) for traffic flowing between a source node (e.g., physical server pm1) and a destination node (e.g., VxLAN server 1), the VxLAN gateways can determine which RBridges the source and destination nodes are connected to, respectively, and then compute the total path costs between the source node and each of the VxLAN gateways and the total path costs between each of the VxLAN gateways and the destination node. In FIG. 2, it should be understood that the traffic will traverse the FGL network between the source node (e.g., physical server pm1) and the VxLAN gateway and traverse the VxLAN between the VxLAN gateway and the destination node (e.g., VxLAN server 1).

To facilitate the VxLAN gateways learning the RBridge nicknames of the other VxLAN gateways in the network 10, each of the VxLAN gateways can be configured to advertise its respective RBridge nickname and, optionally, the IP address used for VxLAN encapsulation. It should be understood that each of the VxLAN gateways can be associated with a unique identifier (e.g., the RBridge nickname) according to the TRILL protocol. Optionally, the RBridge nickname can be included in a Type Length Value (TLV) in the link state protocol used for disseminating the link state information. This is also referred to as the VxLAN Gateway Information TLV herein. Optionally, the link state protocol can be the TRILL IS-IS link state protocol. The VxLAN Gateway Information TLV can optionally include the IP address used for VxLAN encapsulation, as well as the RBridge nickname. For example, if RBridge RB21 (e.g., one of the VxLAN gateways) announces its RBridge nickname using the VxLAN Gateway Information TLV, then RBridge RB12 (e.g., one of the VxLAN gateways) can compute the total path cost for RBridge RB21 to/from the other RBridges in the network 10 in addition to its own path cost to/from the other RBridges in the network 10. Accordingly, a VxLAN gateway can compute path costs between each of the other VxLAN gateways and each of the RBridges in the network 10 provided it knows the RBridge nicknames for the other VxLAN gateways. Additionally, as discussed in detail below, a VxLAN gateway can optionally use the IP address for VxLAN encapsulation when notifying the other RBridges in the network of the optimal VxLAN gateway.

In addition, to compute the total path cost for each of multiple forwarding paths between the source and destination nodes, the VxLAN gateways can determine the RBridges to which the source and destination nodes, respectively, are connected. The determination is different depending on whether the source or destination node is a physical server (e.g., physical server pm1) or a VxLAN server (e.g., VxLAN server 1 or 2). A VxLAN gateway processing traffic from a physical server can determine which RBridge the physical server is connected to via MAC learning. In other words, the VxLAN gateway can determine the RBridge to which the physical server is connected from the physical server's MAC address and RBridge nickname binding using its MAC address table. For example, when the traffic flows from physical server pm1 to VxLAN server 1 through RBridge RB12, the VxLAN gateway (e.g., RBridge RB12) learns the binding between physical server pm1's MAC address and the RBridge nickname associated with ingress RBridge RB21, e.g., the RBridge to which physical server pm1 is connected. Then, using the link state information exchanged through the link state protocol, the VxLAN gateway can compute its own path cost from/to RBridge RB21 as 10. In addition, provided that the VxLAN gateway has obtained the RBridge nicknames of the other VxLAN gateways in the network 10 (e.g., RBridges RB21 and RB22), the VxLAN gateway can also compute path costs of RBridges RB21 and RB22 from/to RBridge RB21 as 0 and 20, respectively.

The process for determining the RBridge to which a VxLAN server is connected is discussed below. The IP addresses used by the VxLAN gateways (e.g., RBridges RB12, RB21 and RB22) and the VTEPs (e.g., VTEPs vtep1 and vtep2) as the source IP addresses for VxLAN encapsulation are in the same IP subnet. This can be achieved by: (1) putting all VTEPs in the same VLAN and (2) configuring the switch virtual interfaces ("SVIs") of the VLAN in the VxLAN gateways. For example, VTEPs vtep1 and vtep2 can be configured to transmit VxLAN encapsulated frames in VLAN "X" and the SVIs for VLAN "X" can be configured on RBridges RB12, RB21 and RB22. The VxLAN gateways can then determine the RBridge to which a VxLAN server is connected through the following bindings: (1) the binding between the MAC address associated with a VxLAN server and the IP address associated with the VTEP (e.g., VxLAN learning), (2) the binding between the IP address associated with the VTEP and the MAC address associated with the VTEP (e.g., ARP), and (3) the binding between the MAC address associated with the VTEP and the RBridge nickname of the ingress RBridge (e.g., MAC learning).

For example, when the traffic flows from VxLAN server 1 to physical server pm1 through RBridge RB12, RBridge RB12 can determine that VxLAN server 1 is connected to RBridge RB22 through the following three bindings. First, through VxLAN learning, RBridge RB12 can find the binding of the MAC address associated with the VxLAN server 1 and the IP address associated with VTEP vtep1 using its VxLAN table. Next, because RBridge 12 is in the same subnet as VTEP vtep1, RBridge RB12 can find the MAC address associated with VTEP vtep1 using its ARP table. Then, through MAC learning, RBridge RB12 can find which RBridge VxLAN server 1 is connected to based on VTEP vtep1's MAC address and RBridge RB22's RBridge nickname using its MAC address table. Using the link state information exchanged through the link state protocol, the VxLAN gateway can compute its own path cost from/to RBridge RB22 as 10. In addition, provided that the VxLAN gateway (e.g., RBridge RB12) has obtained the RBridge nicknames of the other VxLAN gateways in the network 10 (e.g., RBridges RB21 and RB22), the VxLAN gateway can also compute the path costs of RBridges RB21 and RB22 from/to RBridge RB22 as 20 and 0, respectively.

After computing the total path costs of the multiple forwarding paths between the source and destination nodes (e.g., physical server pm1 and VxLAN server 1), the VxLAN gateway (e.g., RBridge RB12, RB21 or RB22) can determine the optimal forwarding path and the optimal VxLAN gateway. It should be understood that traffic flows from the source node to the VxLAN gateway over the FGL network and from the VxLAN gateway to the destination node over the VxLAN. Alternatively or additionally, it should be understood that traffic flows from the source node to the VxLAN gateway over the VxLAN and from the VxLAN gateway to the destination node over the FGL network. This is shown in FIG. 2. The optimal forwarding path is the forwarding path having the fewest hops in the logical network having the greater encapsulation overhead. In other words, the optimal forwarding path is chosen such that traffic makes fewer hops in the logical network associated with the larger encapsulation overhead (e.g., the VxLAN) and more hops in the logical network associated with smaller encapsulation overhead (e.g., the FGL network). In the example implementations discussed herein, VxLAN encapsulation overhead exceeds FGL encapsulation overhead. Thus, the optimal VxLAN gateway is RBridge RB22 and the optimal forwarding path is through RBridge RB22.

Optionally, the VxLAN gateways can be configured to calculate an encapsulation overhead metric. The encapsulation overhead metric ("$E_{O/H}$") can optionally be defined as:

$$E_{O/H} = 1 + \frac{\text{Per Frame Encapsulation Overhead}}{\text{Average Packet Size}} \quad (1)$$

It should be understood that the encapsulation overhead metric provided in Eqn. (1) is provided only as an example and that the encapsulation overhead metric can be defined in other ways. In the examples provided above, the per frame encapsulation overhead of VxLAN encapsulation exceeds FGL encapsulation by 44 bytes. The encapsulation overhead metric calculated using Eqn. (1) is 1.1, assuming an average packet size of 440 bytes. This disclosure contemplates that the average packet size can optionally be more or less than 440 bytes, which is provided only as an example. Then, the total path costs for the multiple forwarding paths can optionally be computed by weighting the path costs (e.g., Weighted Path Cost=$E_{O/H}$×Path Cost) between the each of VxLAN gateways and the destination nodes by the encapsulation overhead metric. Table 1 below shows the total path costs computed for the multiple forwarding paths between physical server pm1 and VxLAN server 1 of FIG. 2, assuming an encapsulation overhead of 44 bytes per frame and an average packet size of 440 bytes.

TABLE 1

| Forwarding Path | FGL Path Cost | VxLAN Path Cost | $E_{O/H}$ | Total Path Cost |
|---|---|---|---|---|
| Via RB12 | 10 | 10 | 1.1 | 21 |
| Via RB21 | 0 | 20 | 1.1 | 22 |
| Via RB22 | 20 | 0 | 1.1 | 20 |

As shown above in Table 1, the optimal forwarding path is via RBridge RB22.

Optimal Forwarding Notification

Optionally, upon determining the optimal forwarding path and optimal VxLAN gateway, the VxLAN gateways can be configured to notify the RBridges and VTEPs in the network 10 of which RBridge is the optimal VxLAN gateway. Consider the following initial traffic flow between physical server pm1 and VxLAN server 1 in FIG. 2. First, physical server pm1 sends a unicast frame to VxLAN server 1. Since lookup fails in RBridge RB21, the frame is sent along the distribution tree to all other RBridges in the network 10, including RBridges RB12 and RB22 (e.g., VxLAN gateways). Optionally, for multi-destination frame handling, only distribution tree root RBridge RB12 performs VxLAN encapsulation and transmits the encapsulated frame to the VxLAN IP multicast address. The distribution tree 16 rooted at RBridge RB12 is shown as a dashed line in FIG. 1. Additionally, RBridge RB12 learns the binding between physical server pm1's MAC address and RBridge RB21's RBridge nickname through MAC address learning, and therefore, RBridge RB12 can compute the FGL path costs between physical server pm1 and all of the VxLAN gateways (e.g., RBridges RB12, RB21 and RB22). In addition, VxLAN sever 1 responds with a unicast frame to physical server pm1. As discussed above, VTEP vtep1 encapsulates the frame, using learned RBridge RB12's IP address as the destination IP address. After RBridge RB12 receives the frame, RBridge RB12 can learn the binding between VxLAN server 1's MAC address and VTEP vtep1's IP address, for example, through the three bindings discussed above. RBridge RB12 can then compute the VxLAN path costs between VxLAN server 1 and all of the VxLAN gateways (e.g., RBridges RB12, RB21 and RB22). The ability of RBridge RB12 to compute the total path costs for the other VxLAN gateways assumes that RBridge RB12 has learned the RBridge nicknames of the other VxLAN gateways, for example, by exchanging messages using the link state protocol including the VxLAN Gateway Information TLV. Additionally, RBridge RB12 can weight the path costs over the VxLAN because VxLAN encapsulation has a higher encapsulation overhead as compared to FGL encapsulation.

Upon computing the total path costs, for example, as shown in Table 1 above, RBridge RB12 realizes that it is not in the optimal forwarding path. RBridge RB12 can optionally be configured to notify one or more RBridges in the network 10 to use the optimal forwarding path, e.g., via RBridge RB22, instead of the forwarding path via RBridge RB12. For example, RBridge RB12 can be configured to notify the RBridge to which physical server pm1 is connected (e.g., RBridge RB21) and VxLAN server 1's VTEP (e.g., VTEP vtep1) to use the optimal path via RBridge RB22.

Optionally, an implicit approach is provided below that can be used by a VxLAN gateway to notify an RBridge or a VTEP of the optimal forwarding path. It should be understood that the implicit approach does not require any protocol changes. A VxLAN gateway can encapsulate FGL frames using the desired optimal VxLAN gateway's RBridge nickname as the ingress RBridge nickname. Thus, the RBridge to which the physical server is connected can learn the binding between the desired MAC address and RBridge nickname and redirect traffic to the optimal VxLAN gateway. For example, RBridge RB12 (e.g., a non-optimal VxLAN gateway) can decapsulate VxLAN frames from VxLAN server 1 and can encapsulate the frames with FGL headers using RBridge RB22's (e.g., an optimal VxLAN gateway) RBridge nickname, instead of its own, as the ingress RBridge nickname. Then, the RBridge to which physical server pm1 is connected (e.g., RBridge RB21) can learn the desired binding between VxLAN server 1's MAC address and RBridge RB22's RBridge nickname and redirect traffic to RBridge RB22. Additionally, a VxLAN gateway can encapsulate VxLAN frames using the desired optimal VxLAN gateway's IP address as the source IP address. The VTEP can learn the desired binding between the MAC address and IP address and redirect the traffic to the optimal VxLAN gateway. For example, RBridge RB12 (e.g., a non-optimal VxLAN gateway) can decapsulate FGL frames from physical server pm1 and can encapsulate the frames with VxLAN headers using RBridge RB22's (e.g., an optimal VxLAN gateway) IP address, instead of its own, as the source IP address. Then, VTEP vtep1 can learn the desired binding between physical server pm1's MAC address and RBridge RB22's IP address and redirect the traffic to RBridge RB22.

Optionally, an explicit approach is provided below that can be used by a VxLAN gateway to notify an RBridge or a VTEP of the optimal forwarding path. Although the explicit approach requires a protocol change, it provides the benefit of fast rerouting when a VxLAN gateway in the optimal forwarding path fails. A VxLAN gateway can use the TRILL ESADI to notify an RBridge to which the physical server is connected of the plurality of bindings between the VxLAN server's MAC address and RBridge nicknames of the VxLAN gateways and the associated VxLAN path costs. In other words, using ESADI, a VxLAN gateway can notify the RBridge to which the physical server is connected of a plurality of bindings with associated VxLAN path costs so that the RBridge can switch to the next-best VxLAN gateway if the optimal VxLAN gateway is detected as unreachable by the link state protocol. The VxLAN can be configured to use a modified MAC Reachability TLV, i.e., a VxLAN MAC Reachability TLV. The VxLAN MAC Reachability TLV can include a list of tuples, including but not limited to, one or more VxLAN server MAC addresses and associated VxLAN gateway RBridge nicknames and VxLAN path costs. When the RBridge receives the VxLAN MAC Reachability TLV, it can compute the total path costs based on its FGL path costs to VxLAN gateways and the advertised VxLAN path costs. For example, RBridge RB12 can use the VxLAN MAC Reachability TLV to announce the bindings of VxLAN server 1's MAC address and the RBridge nicknames of RBridges RB12, RB21 and RB22 (e.g., the VxLAN gateways) with respective VxLAN path costs of 10, 20 and 0. When the RBridge to which physical server pm1 is connected (e.g., RBridge RB21) receives the VxLAN MAC Reachability TLV, it can compute total path costs via RBridges RB12, RB21 and RB22 as 21, 22 and 20, respectively, based on its FGL path costs to RBridges RB12, RB21 and RB22 of 10, 0 and 20, respectively, and the advertised VxLAN path costs of 10, 20 and 0. RBridge RB21 can then redirect the traffic to RBridge RB22 because it is the VxLAN gateway associated with the lowest total path cost.

Additionally, a VxLAN gateway can use a control protocol (e.g., VxLAN Gateway Address Distribution Information (VGADI)) to allow a VxLAN gateway to notify a VTEP of the plurality of bindings between a physical server's MAC address and VxLAN gateway IP addresses of the VxLAN gateways and the associated total path costs. For example, according to VGADI, a VxLAN gateway can unicast its protocol data units ("PDUs") to the IP address of the intended VTEP. Each PDU can carry a VxLAN Gateway Reachability TLV, which includes a list of tuples, including but not limited to, one or more physical server MAC addresses and associated VxLAN gateway IP addresses and total path costs. For example, RBridge RB12 can use the VxLAN Gateway Reachability TLV to inform VTEP vtep1 of the bindings between physical server pm1's MAC address and the IP addresses of RBridges RB12, RB21 and RB22 (e.g., the VxLAN gateways) with respective total path costs of 21, 22 and 20. VTEP vtep1 can then redirect the traffic to RBridge RB22 because it is the optimal VxLAN gateway associated with the lowest total path cost.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 4:
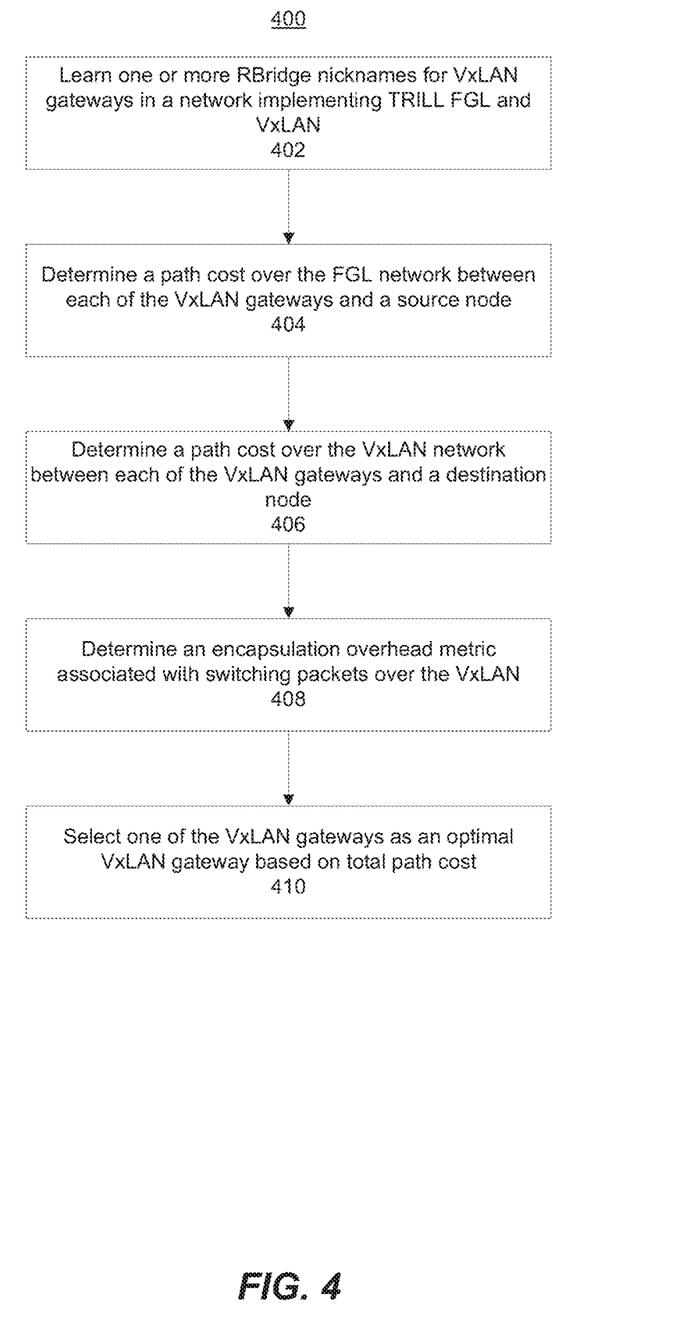
FIG. 4 is a flow diagram illustrating example operations for determining an optimal forwarding path across the network shown in FIG. 1.

Referring now to FIG. 4, a flow diagram illustrating example operations 400 for determining an optimal forwarding path across a network is shown. The network can be the network including RBridges configured to implement both FGL networking and VxLAN schemes, e.g., the network 10 shown in FIG. 1. RBridges configured to implement both FGL and VxLAN networking schemes are VxLAN gateways. As discussed above, the example operations 400 can be carried out by a VxLAN gateway. At 402, one or more RBridge nicknames can be learned. As discussed above, each RBridge nickname is uniquely associated with one of the VxLAN gateways in the network. At 404, a path cost over the FGL network between each of the VxLAN gateways and a source node is determined. Additionally, at 406, a path cost over the VxLAN between each of the VxLAN gateways and a destination node is determined. At 408, an encapsulation overhead metric associated with switching packets over the VxLAN can be determined. Then, at 410, one of the VxLAN gateways can be selected as an optimal VxLAN gateway. The selection can be based on the path cost over the FGL network between each of the VxLAN gateways and the source node, the path cost over the VxLAN between each of the VxLAN gateways and the destination node and the encapsulation overhead metric. Optionally, after selecting an optimal VxLAN gateway, one or more RBridges in the network can be notified of the selection. This facilitates the ability of the RBridges to redirect traffic via the optimal VxLAN gateway.

Figure 5:
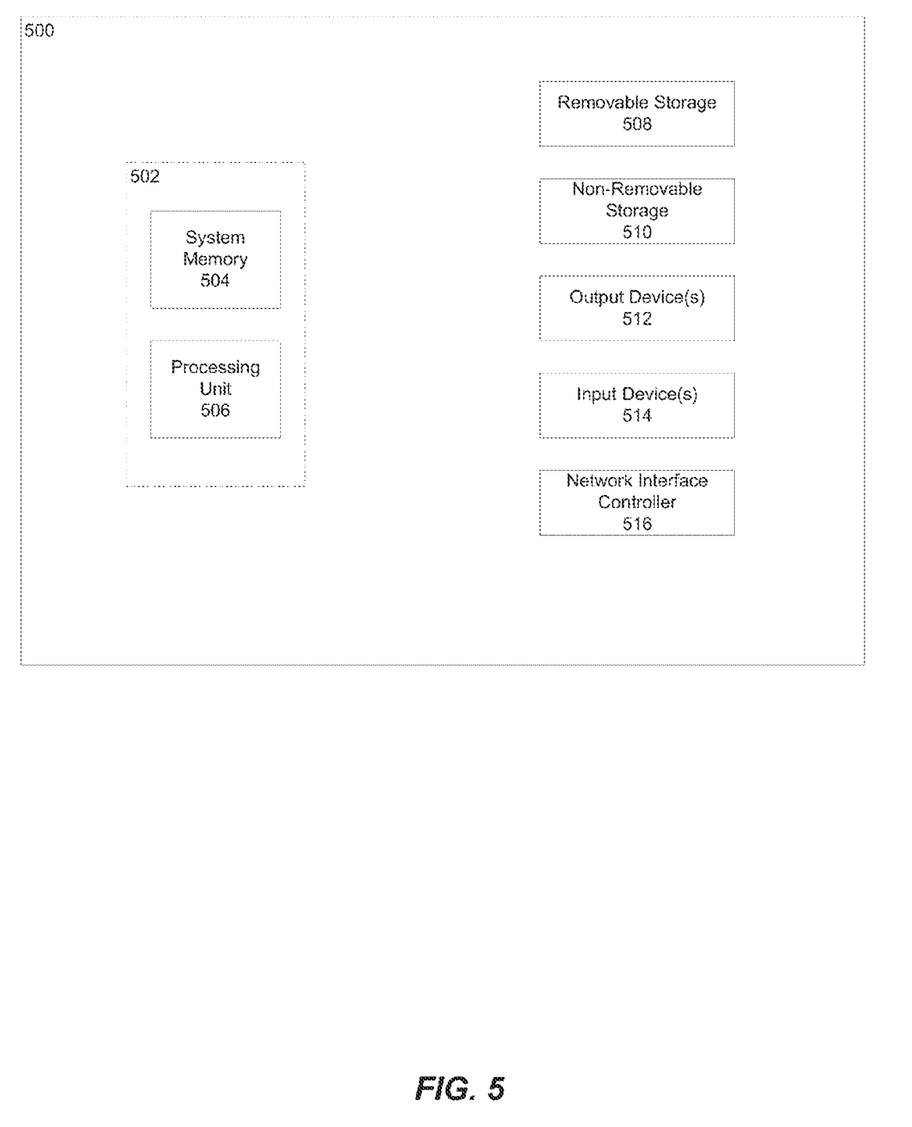
FIG. 5 is a block diagram of an example computing device.

When the logical operations described herein are implemented in software, the process may execute on any type of computing architecture or platform. For example, referring to FIG. 5, an example computing device upon which embodiments of the invention may be implemented is illustrated. In particular, the RBridges and servers discussed above may be a computing device, such as computing device 500 shown in FIG. 5. The computing device 500 may include a bus or other communication mechanism for communicating information among various components of the computing device 500. In its most basic configuration, computing device 500 typically includes at least one processing unit 506 and system memory 504. Depending on the exact configuration and type of computing device, system memory 504 may be volatile (such as random access memory (RAM)), non-volatile (such as read-only memory (ROM), flash memory, etc.), or some combination of the two. This most basic configuration is illustrated in FIG. 5 by dashed line 502. The processing unit 506 may be a standard programmable processor that performs arithmetic and logic operations necessary for operation of the computing device 500. Alternatively or additionally, the processing unit 506 can be an ASIC.

Computing device 500 may have additional features/functionality. For example, computing device 500 may include additional storage such as removable storage 508 and non-removable storage 510 including, but not limited to, magnetic or optical disks or tapes. Computing device 500 may also contain network connection(s) 516 that allow the device to communicate with other devices. Computing device 500 may also have input device(s) 514 such as a keyboard, mouse, touch screen, etc. Output device(s) 512 such as a display, speakers, printer, etc. may also be included. The additional devices may be connected to the bus in order to facilitate communication of data among the components of the computing device 500. All these devices are well known in the art and need not be discussed at length here.

The processing unit 506 may be configured to execute program code encoded in tangible, computer-readable media. Computer-readable media refers to any media that is capable of providing data that causes the computing device 500 (i.e., a machine) to operate in a particular fashion. Various computer-readable media may be utilized to provide instructions to the processing unit 506 for execution. Common forms of computer-readable media include, for example, magnetic media, optical media, physical media, memory chips or cartridges, a carrier wave, or any other medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 506 may execute program code stored in the system memory 504. For example, the bus may carry data to the system memory 504, from which the processing unit 506 receives and executes instructions. The data received by the system memory 504 may optionally be stored on the removable storage 508 or the non-removable storage 510 before or after execution by the processing unit 506.

Computing device 500 typically includes a variety of computer-readable media. Computer-readable media can be any available media that can be accessed by device 500 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for determining an optimal forwarding path across a network, the network including a plurality of virtual extensible local area network ("VxLAN") gateways configured to implement networking protocols for switching packets over a Transparent Interconnect of Lots of Links ("TRILL") fine-grained labeling ("FGL") network and a VxLAN, the method comprising:
    learning one or more RBridge nicknames, each RBridge nickname being uniquely associated with one of the VxLAN gateways in the network;
    determining a path cost over the FGL network between each of the VxLAN gateways and a source node;
    determining a path cost over the VxLAN between each of the VxLAN gateways and a destination node;
    determining an encapsulation cost difference between switching packets over the VxLAN and switching packets over the FGL network;
    determining an encapsulation overhead metric associated with switching packets over the VxLAN, wherein the encapsulation overhead metric is proportional to the encapsulation cost difference;
    weighting the path cost over the VxLAN between each of the VxLAN gateways and the destination node by the encapsulation overhead metric; and
    selecting one of the VxLAN gateways as an optimal VxLAN gateway, wherein the selection is based on the path cost over the FGL network between each of the VxLAN gateways and the source node and the weighted path cost over the VxLAN between each of the VxLAN gateways and the destination node.

2. The method of claim 1, wherein learning one or more RBridge nicknames further comprises transmitting or receiving a message using a link state protocol, the message comprising at least one of an RBridge nickname and an IP address associated with one of the VxLAN gateways in the network.

3. The method of claim 1, wherein the source node comprises a physical server, and the method further comprises determining an RBridge to which the physical server is connected using a media access control ("MAC") address table, wherein the path cost over the FGL network between each of the VxLAN gateways and the source node is determined as a path cost over the FGL network between each of the VxLAN gateways and the RBridge to which the physical server is connected.

4. The method of claim 1, wherein the destination node comprises a VxLAN server, and the method further comprises determining an RBridge to which the VxLAN server is connected using a VxLAN table, an address resolution protocol ("ARP") table and a MAC address table, wherein the path cost over the VxLAN between each of the VxLAN gateways and the destination node is determined as a path cost over the VxLAN between each of the VxLAN gateways and the RBridge to which the VxLAN server is connected.

5. The method of claim 1, further comprising notifying at least one of an RBridge to which the source node is connected and an RBridge to which the destination node is connected of the optimal VxLAN gateway.

6. The method of claim 5, wherein notifying at least one of an RBridge to which the source node is connected and an RBridge to which the destination node is connected of the optimal VxLAN gateway further comprises:
encapsulating a frame with at least one of an RBridge nickname or an IP address associated with the optimal VxLAN gateway; and
transmitting the encapsulated frame.

7. The method of claim 5, wherein notifying an RBridge to which the source node is connected of the optimal VxLAN gateway further comprises advertising a plurality of bindings between a MAC address associated with the destination node and RBridge nicknames and path costs associated with the VxLAN gateways in the network.

8. The method of claim 5, wherein notifying an RBridge to which the destination node is connected of the optimal VxLAN gateway further comprises advertising a plurality of bindings between a MAC address associated with the source node and IP addresses and path costs associated with the VxLAN gateways in the network.

9. A non-transitory computer-readable recording medium having computer-executable instructions stored thereon for determining an optimal forwarding path across a network, the network including a plurality of virtual extensible local area network ("VxLAN") gateways configured to implement networking protocols for switching packets over a Transparent Interconnect of Lots of Links ("TRILL") fine-grained labeling ("FGL") network and a VxLAN, that, when executed by a VxLAN gateway, cause the VxLAN gateway to:
learn one or more RBridge nicknames, each RBridge nickname being uniquely associated with one of the VxLAN gateways in the network;
determine a path cost over the FGL network between each of the VxLAN gateways and a source node;
determine a path cost over the VxLAN between each of the VxLAN gateways and a destination node;
determine an encapsulation cost difference between switching packets over the VxLAN and switching packets over the FGL network;
determine an encapsulation overhead metric associated with switching packets over the VxLAN, wherein the encapsulation overhead metric is proportional to the encapsulation cost difference;
weight the path cost over the VxLAN between each of the VxLAN gateways and the destination node by the encapsulation overhead metric; and
select one of the VxLAN gateways as an optimal VxLAN gateway, wherein the selection is based on the path cost over the FGL network between each of the VxLAN gateways and the source node and the weighted path cost over the VxLAN between each of the VxLAN gateways and the destination node.

10. The non-transitory computer-readable recording medium of claim 9, wherein learning one or more RBridge nicknames further comprises transmitting or receiving a message using a link state protocol, the message comprising at least one of an RBridge nickname and an IP address associated with one of the VxLAN gateways in the network.

11. The non-transitory computer-readable recording medium of claim 9, wherein the source node comprises a physical server, and the non-transitory computer-readable recording medium having further computer-executable instructions stored thereon that, when executed by the VxLAN gateway, cause the VxLAN gateway to determine an RBridge to which the physical server is connected using a media access control ("MAC") address table, wherein the path cost over the FGL network between each of the VxLAN gateways and the source node is determined as a path cost over the FGL network between each of the VxLAN gateways and the RBridge to which the physical server is connected.

12. The non-transitory computer-readable recording medium of claim 9, wherein the destination node comprises a VxLAN server, and the non-transitory computer-readable recording medium having further computer-executable instructions stored thereon that, when executed by the VxLAN gateway, cause the VxLAN gateway to determine an RBridge to which the VxLAN server is connected using a VxLAN table, an address resolution protocol ("ARP") table and a MAC address table, wherein the path cost over the VxLAN between each of the VxLAN gateways and the destination node is determined as a path cost over the VxLAN between each of the VxLAN gateways and the RBridge to which the VxLAN server is connected.

13. The non-transitory computer-readable recording medium of claim 9, having further computer-executable instructions stored thereon that, when executed by the VxLAN gateway, cause the VxLAN gateway to notify at least one of an RBridge to which the source node is connected and an RBridge to which the destination node is connected of the optimal VxLAN gateway.

14. The non-transitory computer-readable recording medium of claim 13, wherein notifying at least one of an RBridge to which the source node is connected and an RBridge to which the destination node is connected of the optimal VxLAN gateway further comprises:
encapsulating a frame with at least one of an RBridge nickname or an IP address associated with the optimal VxLAN gateway; and
transmitting the encapsulated frame.

15. The non-transitory computer-readable recording medium of claim 13, wherein notifying an RBridge to which the source node is connected of the optimal VxLAN gateway further comprises advertising a plurality of bindings between a MAC address associated with the destination node and RBridge nicknames and path costs associated with the VxLAN gateways in the network, and wherein notifying an RBridge to which the destination node is connected of the optimal VxLAN gateway further comprises advertising a plurality of bindings between a MAC address associated with the source node and IP addresses and path costs associated with the VxLAN gateways in the network.

16. A virtual extensible local area network ("VxLAN") gateway in a network including a plurality of VxLAN gateways, each VxLAN gateway being configured to implement networking protocols for switching packets over a Transparent Interconnect of Lots of Links ("TRILL") fine-grained labeling ("FGL") network and a VxLAN, the VxLAN gateway comprising:
a processor; and
a memory operably connected to the processor, the memory having computer-executable instructions stored thereon that, when executed by the processor, cause the VxLAN gateway to:
learn one or more RBridge nicknames, each RBridge nickname being uniquely associated with one of the VxLAN gateways in the network;
determine a path cost over the FGL network between each of the VxLAN gateways and a source node;
determine a path cost over the VxLAN between each of the VxLAN gateways and a destination node;
determine an encapsulation cost difference between switching packets over the VxLAN and switching packets over the FGL network;
determine an encapsulation overhead metric associated with switching packets over the VxLAN, wherein the encapsulation overhead metric is proportional to the encapsulation cost difference;
weight the path cost over the VxLAN between each of the VxLAN gateways and the destination node by the encapsulation overhead metric; and
select one of the VxLAN gateways as an optimal VxLAN gateway, wherein the selection is based on the path cost over the FGL network between each of the VxLAN gateways and the source node and the weighted path cost over the VxLAN between each of the VxLAN gateways and the destination node.

17. The VxLAN gateway of claim 16, wherein learning one or more RBridge nicknames further comprises transmitting or receiving a message using a link state protocol, the message comprising at least one of an RBridge nickname and an IP address associated with one of the VxLAN gateways in the network.

* * * * *